(12) United States Patent
Deng et al.

(10) Patent No.: US 11,588,406 B2
(45) Date of Patent: Feb. 21, 2023

(54) BATTERY CHARGING CIRCUIT AND BATTERY CHARGING METHOD

(71) Applicant: Silergy Semiconductor Technology (Hangzhou) LTD, Hangzhou (CN)

(72) Inventors: Jian Deng, Hangzhou (CN); Qiukai Huang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 175 days.

(21) Appl. No.: 16/935,398

(22) Filed: Jul. 22, 2020

(65) Prior Publication Data

US 2021/0036612 A1 Feb. 4, 2021

(30) Foreign Application Priority Data

Aug. 2, 2019 (CN) .......................... 201910711227.X

(51) Int. Cl.
| | |
|---|---|
| *H02J 7/04* | (2006.01) |
| *H02J 7/16* | (2006.01) |
| *H02M 3/335* | (2006.01) |
| *H02J 7/00* | (2006.01) |
| *H02M 3/158* | (2006.01) |
| *H02M 7/155* | (2006.01) |
| *H02M 3/00* | (2006.01) |
| *H02M 7/04* | (2006.01) |
| *H02M 1/00* | (2006.01) |

(52) U.S. Cl.
CPC ......... *H02M 3/33523* (2013.01); *H02J 7/007* (2013.01); *H02J 7/04* (2013.01); *H02M 3/01* (2021.05); *H02M 3/158* (2013.01); *H02M 3/33571* (2021.05); *H02M 7/04* (2013.01); *H02M 7/1557* (2013.01); *H02J 2207/20* (2020.01); *H02M 1/007* (2021.05)

(58) Field of Classification Search
USPC ................................ 320/106, 107, 108, 140
See application file for complete search history.

(56) References Cited

U.S. PATENT DOCUMENTS

| | | |
|---|---|---|
| 6,005,780 A | 12/1999 | Hua |
| 6,580,258 B2 | 6/2003 | Wilcox et al. |
| 9,325,254 B2 | 4/2016 | Deng et al. |
| 9,331,588 B2 | 5/2016 | Chen |
| 9,488,680 B2 | 11/2016 | Xu |

(Continued)

FOREIGN PATENT DOCUMENTS

| | | | | |
|---|---|---|---|---|
| CN | 1934766 B | * | 6/2012 | ............. H02J 9/062 |
| CN | 103227453 A | * | 7/2013 | ............. G03G 15/80 |

(Continued)

*Primary Examiner* — Brian Ngo

(57) ABSTRACT

A battery charging circuit can include: a primary rectifier circuit configured to rectify an input AC voltage into a rectified voltage signal; a DC-DC converter configured to generate a charging current according to the rectified voltage signal, in order to charge a battery; a control circuit configured to adjust the charging current by controlling an operation state of the DC-DC converter according to a charging requirement, in order to make an average value of the charging current meet the charging requirement; and where the charging current is controlled to be zero when an absolute value of the input AC voltage is lower than a predetermined threshold.

19 Claims, 17 Drawing Sheets

(56) References Cited

U.S. PATENT DOCUMENTS

| | | | |
|---|---|---|---|
| 2011/0291611 A1* | 12/2011 | Manor | H02J 7/02 |
| | | | 320/107 |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |
| 2016/0301233 A1* | 10/2016 | Takeuchi | B60L 53/14 |
| 2018/0294732 A1* | 10/2018 | Ye | H02M 3/337 |

FOREIGN PATENT DOCUMENTS

| | | | | |
|---|---|---|---|---|
| CN | 206155209 U | * | 5/2017 | |
| EP | 3249780 B1 | * | 7/2019 | ........... G01R 15/144 |
| JP | 3327766 B2 | * | 9/2002 | |
| JP | 2006149125 A | * | 6/2006 | |
| JP | 2019047674 A | * | 3/2019 | |
| WO | WO-2017013388 A1 | * | 1/2017 | |

\* cited by examiner

BATTERY CHARGING CIRCUIT AND BATTERY CHARGING METHOD

RELATED APPLICATIONS

This application claims the benefit of Chinese Patent Application No. 2.01910711227.X, filed on Aug. 2, 2019, which is incorporated herein by reference in its entirety.

FIELD OF THE INVENTION

The present invention generally relates to the field of power electronics, and more particularly to battery charging circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

At present, a mobile terminal (e.g., a smartphone) is typically charged through a power adapter. The power adapter generally can include a primary rectifier circuit, a primary filter circuit, a transformer, a secondary rectifier circuit, a secondary filter circuit, and a control circuit. The power adapter converts an input AC current into a stable DC current, which meets the needs of the mobile terminal, and provides the DC current to a power management device and a battery of the mobile terminal, in order to realize charging of the mobile terminal. However, in this charging approach, large-capacity capacitors are required for the input and output terminals of a battery charging circuit, in order to respectively stabilize the input and output voltages. The large-capacity capacitors are essentially electrolytic capacitors, which occupy a relatively large volume, have a relatively short life, and have potential safety hazards.

In one embodiment, a battery charging circuit can include: (i) a primary rectifier circuit configured to rectify an input AC voltage into a rectified voltage signal; (ii) a DC-DC converter configured to generate a charging current according to the rectified voltage signal, in order to charge a battery; (iii) a control circuit configured to adjust the charging current by controlling an operation state of the DC-DC converter according to a charging requirement, in order to make an average value of the charging current meet the charging requirement; and (iv) where the charging current is controlled to be zero when an absolute value of the input AC voltage is lower than a predetermined threshold.

Figure 1:
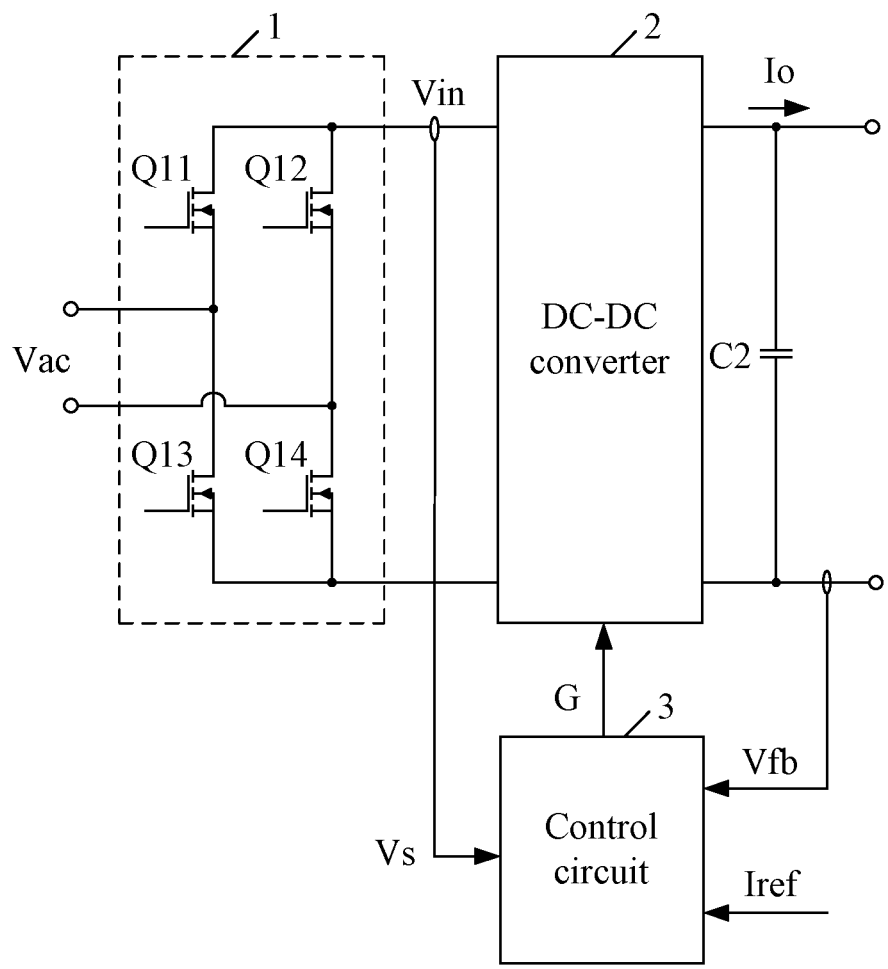
FIG. 1 is a schematic block diagram of a battery charging circuit, in accordance with embodiments of the present invention.

Referring now to FIG. 1, shown is a schematic block diagram of a battery charging circuit, in accordance with embodiments of the present invention. In this particular example, the battery charging circuit can include primary rectifier circuit 1, DC-DC converter 2, and control circuit 3. Primary rectifier circuit 1 can rectify input AC voltage Vac into rectified voltage signal Vin. The input port of DC-DC converter 2 can connect to the output port of primary rectifier circuit 1, and DC-DC converter 2 can receive rectified voltage signal Vin, and may generate charging current Io at the output port of DC-DC converter 2, in order to charge the battery. Control circuit 3 can adjust charging current Io by controlling the operation state of DC-DC converter 2 according to the charging requirement to make the average value of charging current Io meet the charging requirement. Charging current Io can be intermittent, and charging current Io may be equal to zero at least when the absolute value of input AC voltage Vac is lower than a predetermined threshold. Primary rectifier circuit 1 can include switches Q11, Q12, Q13, and Q14. Switches Q11 and Q14 can be controlled to be turned on or off synchronously, and switches Q12 and Q13 can be controlled to be turned on or off synchronously in the opposite manner relative to switches Q11 and Q14. Thus, primary rectifier circuit 1 can rectify input AC voltage Vac into output rectified voltage signal Vin.

In particular embodiments, primary rectifier circuit 1 may utilize a synchronous rectification approach for rectification. However, primary rectifier circuit 1 may alternatively use other methods (e.g., diode rectification) to rectify input AC voltage Vac. Further, primary rectifier circuit 1 of certain embodiments utilizes a full-bridge rectifier circuit; however, primary rectifier circuit 1 can include other types of rectifier circuits. Since primary rectifier circuit 1 adopts a full-bridge rectifier circuit in this example, the absolute value of input AC voltage Vac lower than the predetermined threshold can be equivalent to rectified voltage signal Vin lower than the predetermined threshold. DC-DC converter 2 can be a resonant converter or multi-level converter, and charging current Io may be a pulsating current that changes periodically.

Generally, most mobile terminals may not operate when an AC source is directly used as a power supply due to the changing value of the AC current. When the AC source charges the mobile terminal through the power adapter, the AC current provided by the AC source can be converted into stable DC current by the power adapter to be supplied to the mobile terminal. Therefore, the electrolytic capacitors can be set up in the existing battery charging circuit for energy storage to maintain stable energy supply. However, the volume of the electrolytic capacitor is generally large and the electrolytic capacitor can easily be damaged, thus making such a battery charging circuit relatively large and short-lived. In particular embodiments, the battery charging circuit can charge the battery of the mobile terminal, and the battery may supply power to the mobile terminal. In this way, the continuity of power supply is guaranteed by the battery, and the battery can be regarded as a capacitive load, such that the battery charging circuit may not need a continuously output stable DC current when the battery charging circuit charges the battery. In addition, no electrolytic capacitor is provided in the battery charging circuit of certain embodiments, and the battery charging circuit can output charging current Io to charge the battery. Thus, the volume of the battery charging circuit can be reduced, and the service life and safety performance of the battery charging circuit can be improved. While some capacitive elements are involved in the battery charging circuit of particular embodiments, such capacitive elements are not large-capacity electrolytic capacitors, and instead are used for filtering, integration, etc. for example, the capacitive elements can be chip capacitors or other relatively small capacitors.

The battery charging circuit of certain embodiments can convert the input AC voltage into a pulsating current and outputs it to the battery, such that the pulsating current can directly charge the battery quickly. In certain embodiments, charging the battery by the pulsating current can reduce the lithium precipitation of the lithium battery in order to improve the service life of the battery, thus reducing the arcing probability and arcing strength of the contact of the charging interface to improve the service life of the charging interface, reducing the polarization effect and the heat of the battery, increasing the charging speed, and accordingly ensuring the safety and reliability of the battery during charging. In addition, since the pulsating current is output to the battery, there may be no need to provide electrolytic capacitors in the battery charging circuit, which not only can simplify and miniaturize the battery charging circuit, but also greatly reduce the cost. The battery charging circuit of certain embodiments can include capacitor C2 coupled to the output port of DC-DC converter 2 for filtering the output signal of DC-DC converter 2, where C2 is not an electrolytic capacitor.

Control circuit 3 can generate control signal G according to the charging requirement, and adjust charging current Io by controlling the operation state of DC-DC converter 2 according to control signal G to make the average value of charging current Io meet the charging requirement. For example, charging current Io is intermittent, and charging current Io is equal to zero at least when the absolute value of input AC voltage Vac is lower than the predetermined threshold. Further, when the absolute value of input AC voltage Vac is lower than the predetermined threshold, control circuit 3 can control DC-DC converter 2 not to operate (e.g., be disabled) so that charging current Io is equal to zero. When the absolute value of input AC voltage Vac is higher than the predetermined threshold, control circuit 3 can control DC-DC converter 2 to operate so that charging current Io is not equal to zero. Thus, the intermittent charging current Io can be obtained. In one example, the value of charging current Io in the interval where charging current Io is not equal to zero is fixed, and the waveform of charging current Io can be a square wave. In another example, the value of charging current Io in the interval where charging current Io is not equal to zero is variable, and the waveform of charging current Io can be a triangular wave, a sine wave, or the like. When the absolute value of input AC voltage Vac is higher than the predetermined threshold, control circuit 3 can adjust the operating frequency of DC-DC converter 2 in order to adjust charging current Io, and DC-DC converter 2 can operate with a fixed duty cycle at the operating frequency. Further, the frequency of charging current Io can be twice as greater as the frequency of input AC voltage Vac, or the frequency of charging current Io may be about twice as greater as the frequency of input AC voltage Vac.

Both the input port and the output port of DC-DC converter 2 may not be provided with electrolytic capacitors. DC-DC converter 2 can be a resonant converter (e.g., an LLC resonant circuit), such as a half-bridge LLC circuit, a three-level LLC circuit, a three-level LLC circuit with flying capacitors, a full-bridge LLC circuit, or the like. Since the LLC resonant circuit has advantages of relatively small size and high efficiency, the volume of the battery charging circuit can be further reduced, and the efficiency of battery charging circuit can be improved. It should be understood that DC-DC converter 2 can also be other types of resonant circuits, such as LCC resonant circuit. For example, the LLC resonant circuit can be controlled by a fixed duty cycle, and the output signal of the LLC resonant circuit may be adjusted by adjusting the operating frequency of the LLC resonant circuit. That is, under different input voltages, the output signal of the LLC resonant circuit can be adjusted by adjusting the operating frequency (e.g., switching frequency) with the duty cycle unchanged.

Control circuit 3 can adjust charging current Io by controlling the operation state of DC-DC converter 2 according to the charging requirement. Further, control circuit 3 can control the operation state of DC-DC converter 2 according to input voltage sampling signal Vs representing rectified voltage signal Vin (e.g., the input voltage of DC-DC converter 2) such that charging current Io is intermittent. For example, at least when the absolute value of input AC voltage Vac is lower than the predetermined threshold, control circuit 3 can control DC-DC converter 2 not to operate so that charging current Io is equal to zero. At most when the absolute value of input AC voltage Vac is higher than the predetermined threshold, control circuit 3 can control DC-DC converter 2 to operate so that charging current Io is not equal to zero. Thus, charging current Io can be a pulsating current. When the absolute value of input AC voltage Vac is higher than the predetermined threshold, control circuit 3 may generate control signal G according to output current sampling signal Vfb representing charging current Io (e.g., the output current of DC-DC converter 2) and current reference signal Iref, to make charging current Io meet the charging requirement.

Figure 2:
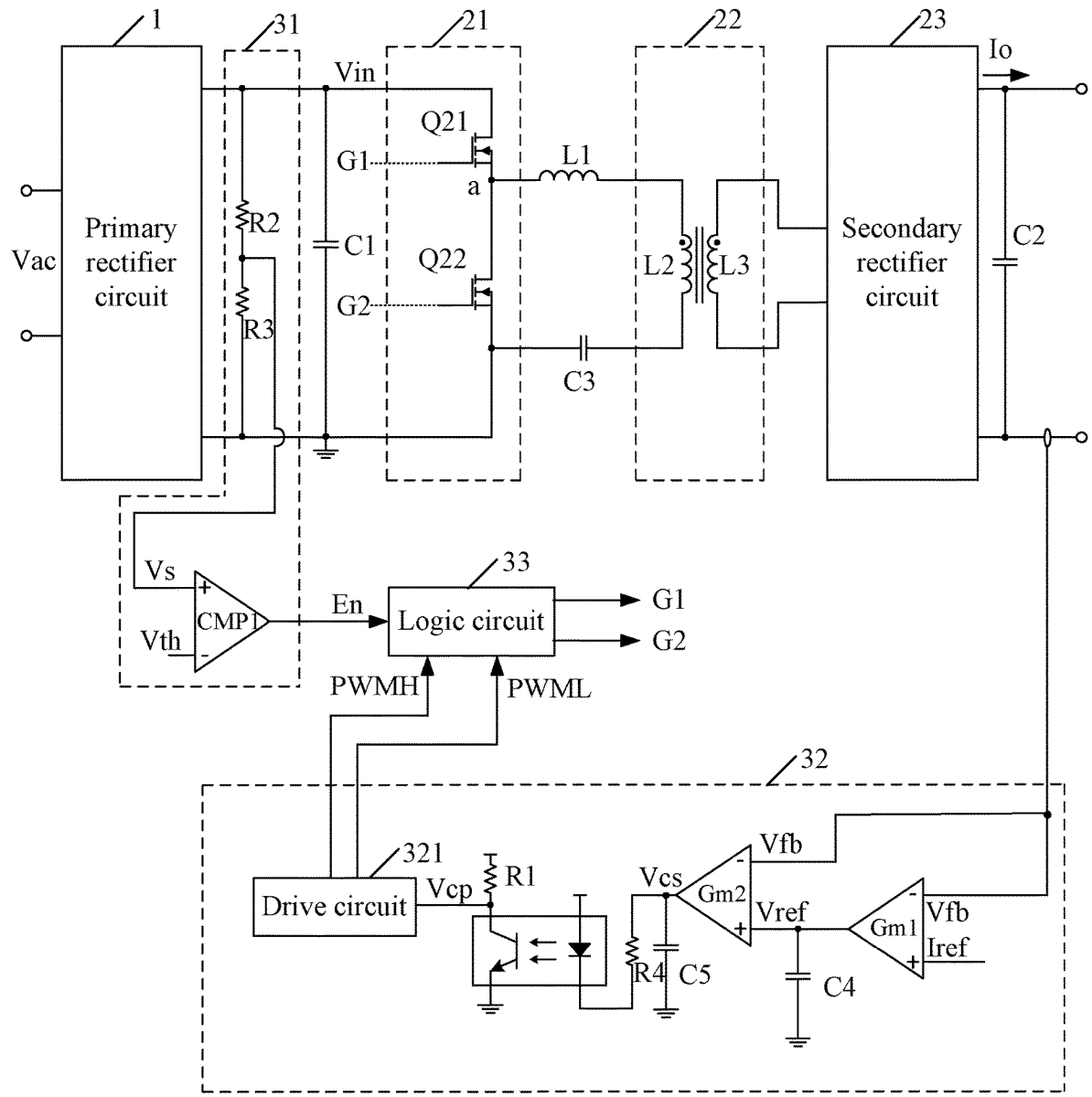
FIG. 2 is a schematic block diagram of a first example battery charging circuit, in accordance with embodiments of the present invention.

Referring now to FIG. 2, shown is a schematic block diagram of a first example battery charging circuit, in accordance with embodiments of the present invention. In this particular example, DC-DC converter 2 uses a half-bridge LLC circuit, which can include switching circuit 21, transformer 22, secondary rectifier circuit 23, resonant inductor L1, and resonant capacitor C3. In this example, switching circuit 21 can include switches Q21 and Q22, where the common node of switches Q21 and Q22 is terminal/node "a." Switch Q21 can connect between the output port of primary rectifier circuit 1 and common node a, and switch Q22 can connect between common node a and the ground terminal. Switches Q21 and Q22 can be controlled by control signals G1 and G2 to be turned on or off, respectively. For example, when switch Q21 is turned on and switch Q22 is turned off, the half-bridge LLC circuit can couple to the output port of primary rectifier circuit 1, and rectified voltage signal Vin output by primary rectifier circuit 1 can power the battery and charge the energy storage elements of the half-bridge LLC circuit. When switch Q21 is turned off and switch Q22 is turned on, the battery may be powered by discharging the energy storage elements of the half-bridge LLC circuit.

In this example, capacitor C1 can connect to the output port of primary rectifier circuit 1 for filtering rectified voltage signal Vin output by primary rectifier circuit 1, and capacitor C1 is not an electrolytic capacitor. In this example, transformer 22 can include primary winding L2 and secondary winding L3. Resonant inductor L1 can connect between common node a and one end of primary winding L2, and resonant capacitor C3 can connect between the other end of primary winding L2 and the ground terminal. Thus, resonant inductor L1, primary winding L2, and resonant capacitor C3 may be coupled in series to form the LLC resonant circuit, where resonant capacitor C3 is not an electrolytic capacitor.

Further, the LLC resonant circuit can be controlled by a fixed duty cycle, and charging current Io output by the LLC resonant circuit may be adjusted by adjusting the operating frequency (e.g., switching frequency) of the LLC resonant circuit. That is, under different input voltages, charging current Io can be adjusted by adjusting the operating frequency with the fixed duty cycle in order to make the average value of charging current Io meet the charging requirement. The LLC resonant circuit may have two fixed resonant frequencies f1 and f2, as follows in formulas (1) and (2).

$$f1 = \frac{1}{2\pi\sqrt{L1 * C3}} \quad (1)$$

$$f2 = \frac{1}{2\pi\sqrt{(L1 + L2) * C3}} \quad (2)$$

Here, f1 is the "first" resonant frequency, and f2 is the "second" resonant frequency. When the operating frequency is greater than resonant frequency f1, the LLC resonant circuit may operate in a buck mode. When the operating frequency is greater than resonant frequency f2 and less than resonant frequency f1, the LLC resonant circuit may operate in a boost mode. Thus, the output signal of the LLC resonant circuit can be controlled by controlling the operating frequency, thereby adjusting charging current Io. In this example, secondary rectifier circuit 23 can connect to secondary winding L3, and the induced AC current of secondary-side may be rectified by secondary rectifier circuit 23 to provide charging current Io output by DC-DC converter 2 to charge the battery.

Control circuit 3 can adjust the operation frequency of DC-DC converter 2 to adjust charging current Io. For example, control circuit 3 can include control signal generation circuit 31, control signal generation circuit 32, and logic circuit 33. Control signal generation circuit 31 can generate control signal En according to rectified voltage signal Vin and predetermined threshold Vth. Control signal generation circuit 32 can generate control signals PWMH and PWML according to the charging requirement and charging current Io output by DC-DC converter 2. Logic circuit 33 can adjust charging current Io according to control signal En and control signals PWMH and PWML. Further, logic circuit 33 can control the operation frequency of DC-DC converter 2 with a fixed duty cycle according to control signals PWMH and PWML in response to control signal En being active, and can control DC-DC converter 2 not to operate in response to control signal En being inactive.

In this example, control signal generation circuit 31 can include an input sampling circuit and comparator CMP1. The input sampling circuit can include resistors R2 and R3, and resistors R2 and R3 can connect in series at the output port of primary rectifier circuit 1 to sample rectified voltage signal Vin so as to obtain input voltage sampling signal Vs. The first input terminal of comparator CMP1 may receive input voltage sampling signal Vs, and the second input terminal of comparator CMP1 may receive predetermined threshold Vth. Comparator CMP1 can compare input voltage sampling signal Vs against predetermined threshold Vth to generate control signal En. Control signal En (e.g., an enable signal) may be at a high level in response to input voltage sampling signal Vs being greater than predetermined threshold Vth, and control signal En may be at a low level in response to input voltage sampling signal Vs being less than predetermined threshold Vth.

Control signal generation circuit 32 can include error amplifier Gm1, error amplifier Gm2, a compensation circuit, and drive circuit 321. Error amplifier Gm1 can compare output current sampling signal Vfb against current reference signal Iref to obtain error signal Vref. Error amplifier Gm2 can compare output current sampling signal Vfb and error signal Vref to obtain error signal Vcs. The compensation circuit can generate compensation signal Vcp according to error signal Vcs. Drive circuit 321 can generate control signals PWMH and PWML according to compensation signal Vcp. The first input terminal of error amplifier Gm1 may receive current reference signal Iref, and the second input terminal of error amplifier Gm1 may receive output current sampling signal Vfb. Output current sampling signal Vfb can represent charging current Io as a voltage signal, and current reference signal Iref may represent the charging requirement, and also represent the average current required when the battery is charged. Thus, the output signal of error amplifier Gm1 may represent the difference between the actual charging current Io and the required charging current. In this way, an average current loop can be formed to control the average value of charging current Io to approach current reference signal Iref. Control signal generation circuit 32 can also include capacitor C4 coupled between the output terminal of error amplifier Gm1 and the ground terminal, and capacitor C4 can convert the current signal output by error amplifier Gm1 into a voltage signal (e.g., error signal Vref), where capacitor C4 is not an electrolytic capacitor.

In this example, error signal Vref used as a reference signal may be input to the first input terminal of error amplifier Gm2, and the second input terminal of error amplifier Gm2 may receive output current sampling signal Vfb to obtain error signal Vcs by comparing output current sampling signal Vfb against error signal Vref. In this way, an instantaneous current loop can be formed to control the instantaneous value of charging current Io by adjusting the operation frequency of DC-DC converter 2. Control signal generation circuit 32 can also include capacitor C5 coupled between the output terminal of error amplifier Gm2 and the ground terminal, and capacitor C5 can convert the current signal output by error amplifier Gm2 into a voltage signal (e.g., error signal Vcs), where capacitor C5 is not an electrolytic capacitor. In this example, the compensation circuit can include resistor R1, resistor R4, and an optocoupler, and may generate compensation signal Vcp according to error signal Vcs. In this example, drive circuit 321 can generate control signals PWMH and PWML according to compensation signal Vcp, and control signals PWMH and PWML are pulse-width modulation (PWM) signals.

Logic circuit 33 can adjust charging current Io according to control signal En and control signals PWMH and PWML. Further, logic circuit 33 may not activate control signals G1 and G2 when control signal En is at a low level, and logic circuit 33 may generate control signals G1 and G2 according to control signals PWMH and PWML when control signal En is at a high level in order to control the operation frequency of switching circuit 21 with a fixed duty cycle. In another example, control signals G1 and G2 output by logic circuit 33 may both at a low level when control signal En is at a low level, and logic circuit 33 can output control signals PWMH and PWML as control signals G1 and G2 when control signal En is at a high level.

Figure 3:
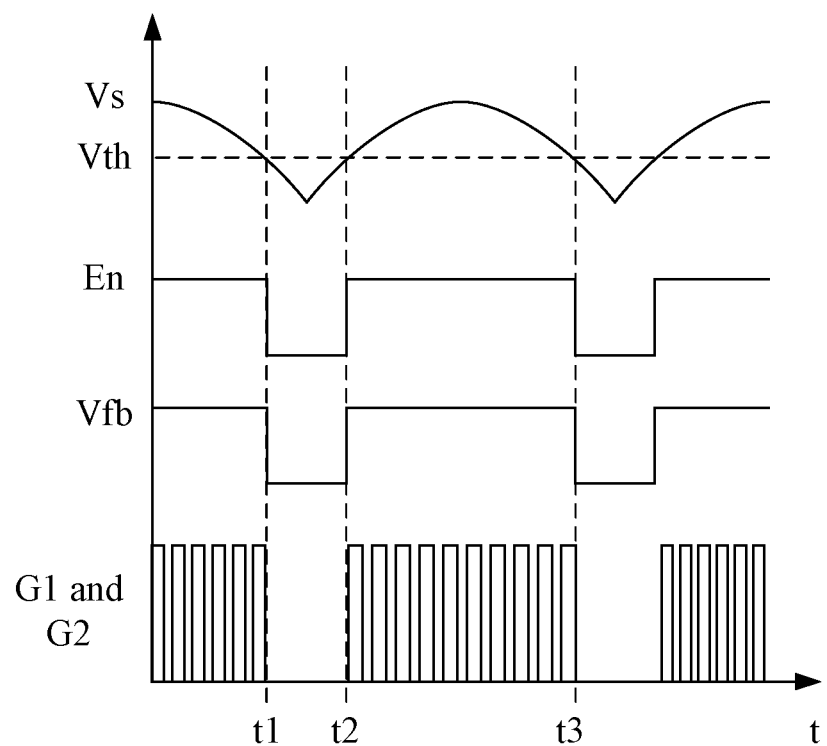
FIG. 3 is a waveform diagram of a first example operation of the first example battery charging circuit, in accordance with embodiments of the present invention.

Referring now to FIG. 3, shown is a waveform diagram of a first example operation of the first example battery charging circuit, in accordance with embodiments of the present invention. Here, shown are waveforms of input voltage sampling signal Vs, predetermined threshold Vth, control signal En, output current sampling signal Vfb, and control signals G1 and G2, where the abscissa is time t. For example, at time t1, input voltage sampling signal Vs drops to be equal to predetermined threshold Vth, and control signal En switches to be the low level. Logic circuit 33 may not activate control signals G1 and G2, and can control switching circuit 21 not to operate. That is, switches Q21 and Q22 are turned off. So, charging current Io can be equal to zero (or close to zero) and output current sampling signal Vfb may be equal to zero. At time t2, input voltage sampling signal Vs rises to be equal to predetermined threshold Vth, and control signal En switches to be the high level. Logic circuit 33 can generate control signals G1 and G2 to control switching circuit 21 to operate, such that switches Q21 and Q22 are alternately turned on or off. Therefore, charging current Io is higher (e.g., greater than zero) and output current sampling signal Vfb is also higher. At time t3, input voltage sampling signal Vs may again drop to be equal to predetermined threshold Vth. Switches Q21 and Q22 can both be turned off during a period in each cycle, such that charging current Io is equal to zero. Also, switches Q21 and Q22 may alternately be turned on or off during another period in each cycle, such that charging current Io is higher (e.g., greater than zero). In this way, charging current Io can be a pulse current.

Figure 4:
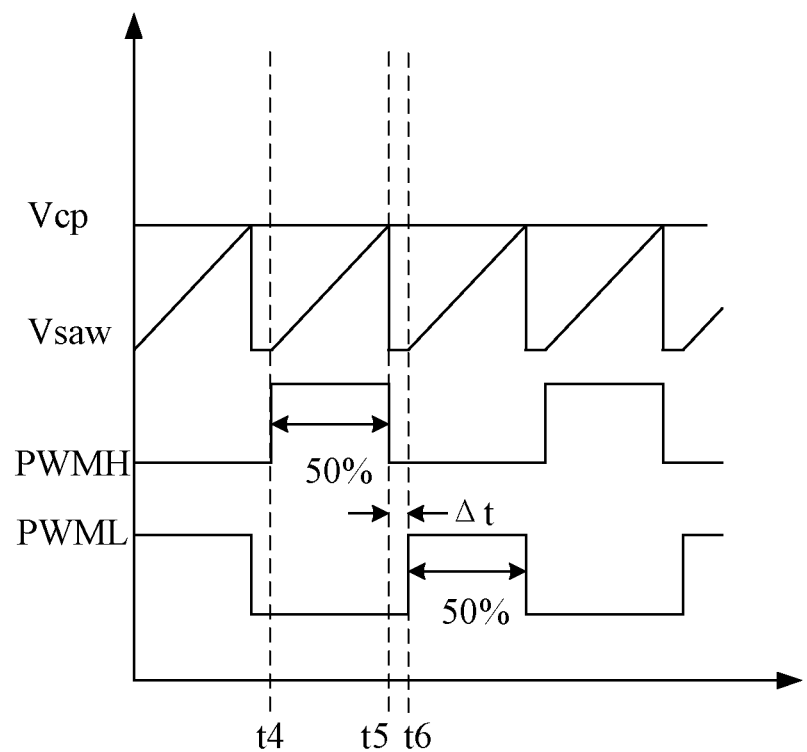
FIG. 4 is a waveform diagram of a second example operation of the first example battery charging circuit, in accordance with embodiments of the present invention.

Referring now to FIG. 4, shown is a waveform diagram of a second example operation of the first example battery charging circuit, in accordance with embodiments of the present invention. Here, shown are waveforms of compensation signal Vcp, ramp signal Vsaw, and control signals PWMH and PWML during the period when switches Q21 and Q22 are alternately turned on or off, where the abscissa is time t. For example, during the period when switches Q21 and Q22 are alternately turned on or off, at time t4, ramp signal Vsaw starts to rise, control signal PWMH is switched to be the high level, and control signal PWML may remain at the low level. At time t5, ramp signal Vsaw rises to be equal to compensation signal Vcp, control signal PWMH is switched to be the low level, and control signal PWML may remain at the low level. After dead time Δt (e.g., at time t6), ramp signal Vsaw may again start to rise, control signal PWMH may remain at the low level, and control signal PWML can be switched to be the high level. The duty cycles of control signals PWMH and PWML can be fixed (e.g., about 50%), and the operation frequency of DC-DC converter 2 may be controlled with the fixed duty cycle.

Thus, the operating frequency of DC-DC converter 2 can be adjusted according to the difference between current reference signal Iref and output current sampling signal Vfb, and DC-DC converter 2 can be operated at the operating frequency with a fixed duty cycle. Thus the average value of charging current Io may be adjusted to meet the charging requirement so as to charge the battery. In this example, switches Q21 and Q22 can use various existing electrically controllable switches, such as a metal oxide semiconductor field effect transistor (MOSFET), a bipolar junction transistor (BJT), or insulated gate bipolar transistor (IGBT).

In particular embodiments, the battery charging circuit may adjust the charging current by controlling the operation state of the DC-DC converter according to the charging requirement to make the average value of the charging current meet the charging requirement. The charging current can be intermittent, and the charging current may be equal to zero at least when the absolute value of the input AC voltage is lower than the predetermined threshold. Thus, the battery can be charged by the charging current which is intermittent, the electrolytic capacitors in the charging circuit can be removed, the volume of the battery charging circuit can be reduced, and the service life and safety performance of the battery charging circuit can be improved, as compared to other approaches.

Figure 5:
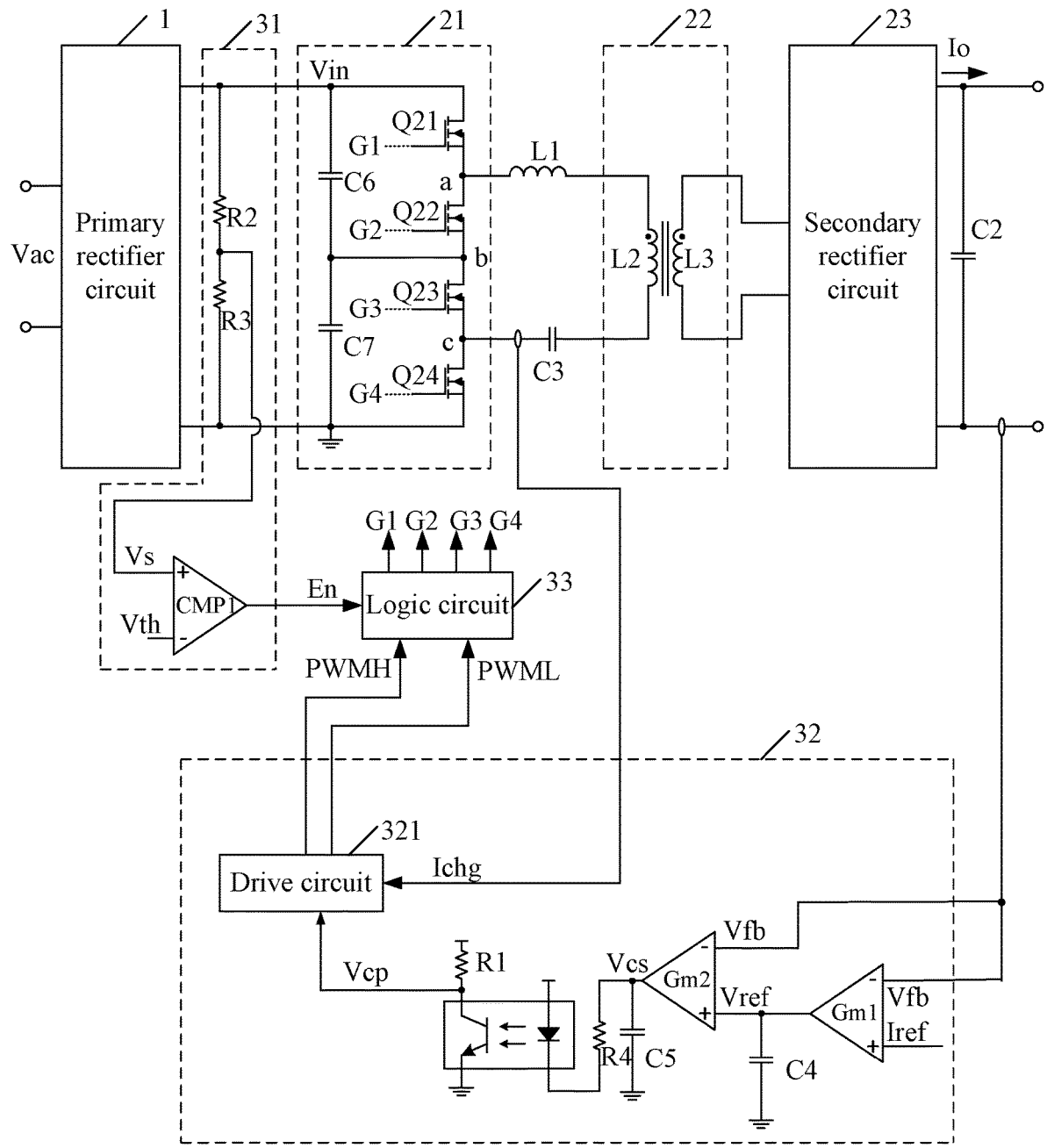
FIG. 5 is a schematic block diagram of a second example battery charging circuit, in accordance with embodiments of the present invention.

Referring now to FIG. 5, shown is a schematic block diagram of a second example battery charging circuit, in accordance with embodiments of the present invention. In this particular example, DC-DC converter 2 utilizes a three-level LLC circuit, which can include switching circuit 21, transformer 22, secondary rectifier circuit 23, resonant inductor L1, and resonant capacitor C3. Switching circuit 21 can include switches Q21, Q22, Q23, and Q24, where the common node of switches Q21 and Q22 is terminal/node "a," the common node of switch Q22 and switch Q23 is terminal/node "b," and the common node of switches Q23 and Q24 is terminal/node "c." Switch Q21 can connect between the output port of primary rectifier circuit 1 and common node a, switch Q22 can connect between common node a and common node b, switch Q23 can connect between common node b and common node c, and switch Q24 can connect between common node c and the ground terminal. Capacitor C6 can connect between the output port of primary rectifier circuit 1 and common node b, capacitor C7 can connect between common node b and the ground terminal, and capacitor C6 and capacitor C7 are not electrolytic capacitors. Switches Q21, Q22, Q23, and Q24 can be respectively controlled by control signals G1, G2, G3, and G4 to be turned on or off. For example, switches Q21 and Q24 can be controlled to be turned on or off synchronously, and switches Q22 and Q23 can be controlled to be turned on or off synchronously in the opposite manner with respect to switches Q21 and Q24, in order to charge the battery.

In this example, transformer 22 can include primary winding L2 and secondary winding L3. Resonant inductor L1 can connect between common node a and one end of primary winding L2, and resonant capacitor C3 can connect between the other end of primary winding L2 and common node c. Thus, resonant inductor L1, primary winding L2, and resonant capacitor C3 can be coupled in series to form the LLC resonant circuit, where resonant capacitor C3 is not an electrolytic capacitor. Secondary rectifier circuit 23 can connect to secondary winding L3, the induced AC current of secondary-side is rectified by secondary rectifier circuit 23, in order to provide charging current Io output by DC-DC converter 2 to charge the battery. In this example, drive circuit 321 can acquire resonance current sampling signal Ichg, and may generate control signals PWMH and PWML according to resonance current sampling signal Ichg and compensation signal Vcp.

Figure 6:
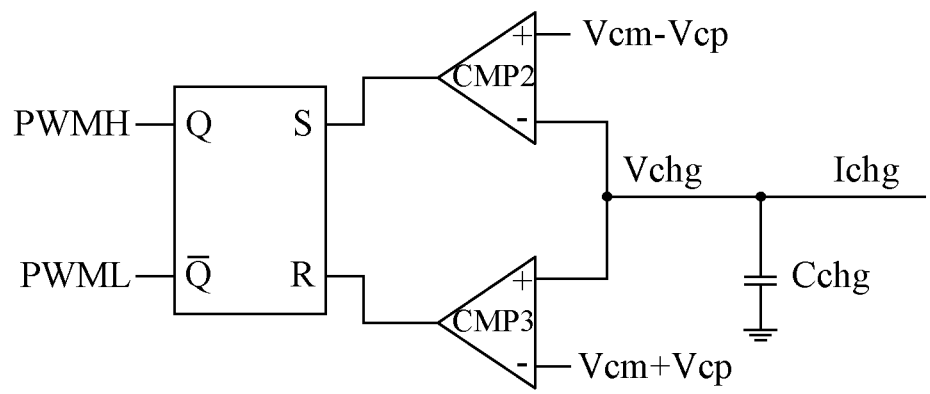
FIG. 6 is a schematic block diagram of an example drive circuit for the second example battery charging circuit, in accordance with embodiments of the present invention.

Referring now to FIG. 6, shown is a schematic block diagram of an example drive circuit for the second example battery charging circuit, in accordance with embodiments of the present invention. In this particular example, drive circuit 321 can include comparator CMP2, comparator CMP3, and RS flip-flop. For example, drive circuit 321 can also include capacitor Cchg which converts resonance current sampling signal Ichg into a corresponding voltage signal Vchg. Voltage signal Vchg may be input to the inverting input terminal of comparator CMP2 and the non-inverting input terminal of comparator CMP3, where capacitor Cchg is not an electrolytic capacitor. It should be understood that drive circuit 321 good directly sample the voltage of resonant capacitor C3 to use it directly as voltage signal Vchg without capacitor Cchg. At the same time, drive circuit 321 may acquire a fixed common mode voltage signal Vcm. The non-inverting input terminal of comparator CMP2 may receive the difference between common mode voltage signal Vcm and compensation signal Vcp, and the inverting input terminal of comparator CMP3 may receive the sum of common mode voltage signal Vcm and compensation signal Vcp. Logic circuit 33 can adjust charging current Io according to control signal En and control signals PWMH and PWML. Further, logic circuit 33 does not activate control signals G1, G2, G3, and G4 when control signal En is at a low level, and logic circuit 33 can generate control signals G1, G2, G3 and G4 according to control signals PWMH and PWML when control signal En is at a high level to control the operation frequency of switching circuit 21 with a fixed duty cycle.

Figure 7:
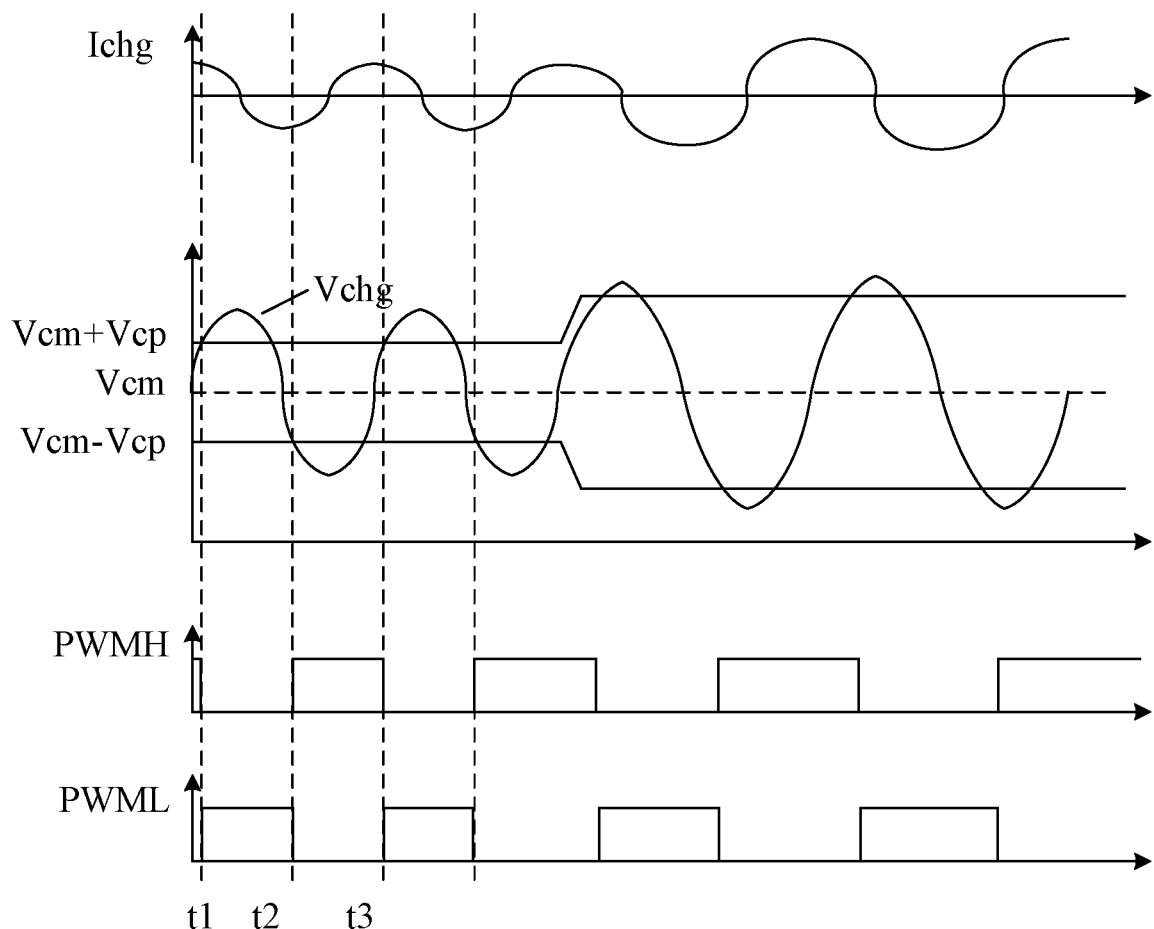
FIG. 7 is a waveform diagram of operation of the second example battery charging circuit, in accordance with embodiments of the present invention.

Referring now to FIG. 7, shown is a waveform diagram of operation of the second example battery charging circuit, in accordance with embodiments of the present invention. Here, shown are waveforms of resonance current sampling signal Ichg, voltage signal Vchg, and control signals PWMH and PWML during the period when switches Q21, Q22, Q23, and Q24 are alternately turned on or off, where the abscissa is time t. For example, at time t1, voltage signal Vchg rises to be equal to Vcm+Vcp, the output signal of comparator CMP3 is at the high level; that is, the reset signal of the RS flip-flop is active, control signal PWMH can be switched to be the low level, and control signal PWML may be switched to be the high level. At time t2, voltage signal Vchg drops to be equal to Vcm-Vcp, the output signal of comparator CMP2 is at the high level; that is, the set signal of the RS flip-flop may be active, control signal PWMH can be switched to be the high level, and control signal PWML may be switched to be the low level. The duty cycles of the control signals PWMH and PWML may be fixed (e.g., about 50%), and the operation frequency of DC-DC converter 2 can be controlled with the fixed duty cycle. In this example, switches Q21, Q22, Q23, and Q24 can use various existing electrically controllable switch, such as a MOSFET, a BJT, or IGBT.

In particular embodiments, the battery charging circuit can adjust the charging current by controlling the operation state of the DC-DC converter according to the charging requirement, in order to make the average value of the charging current meet the charging requirement. The charging current can be intermittent, and the charging current may be equal to zero at least when the absolute value of the input AC voltage is lower than the predetermined threshold. Thus, the battery can be charged by the charging current which is intermittent, the electrolytic capacitors in the charging circuit can be removed, the volume of the battery charging circuit can be reduced, and the service life and safety performance of the battery charging circuit can be improved, relative to other approaches.

Figure 8:
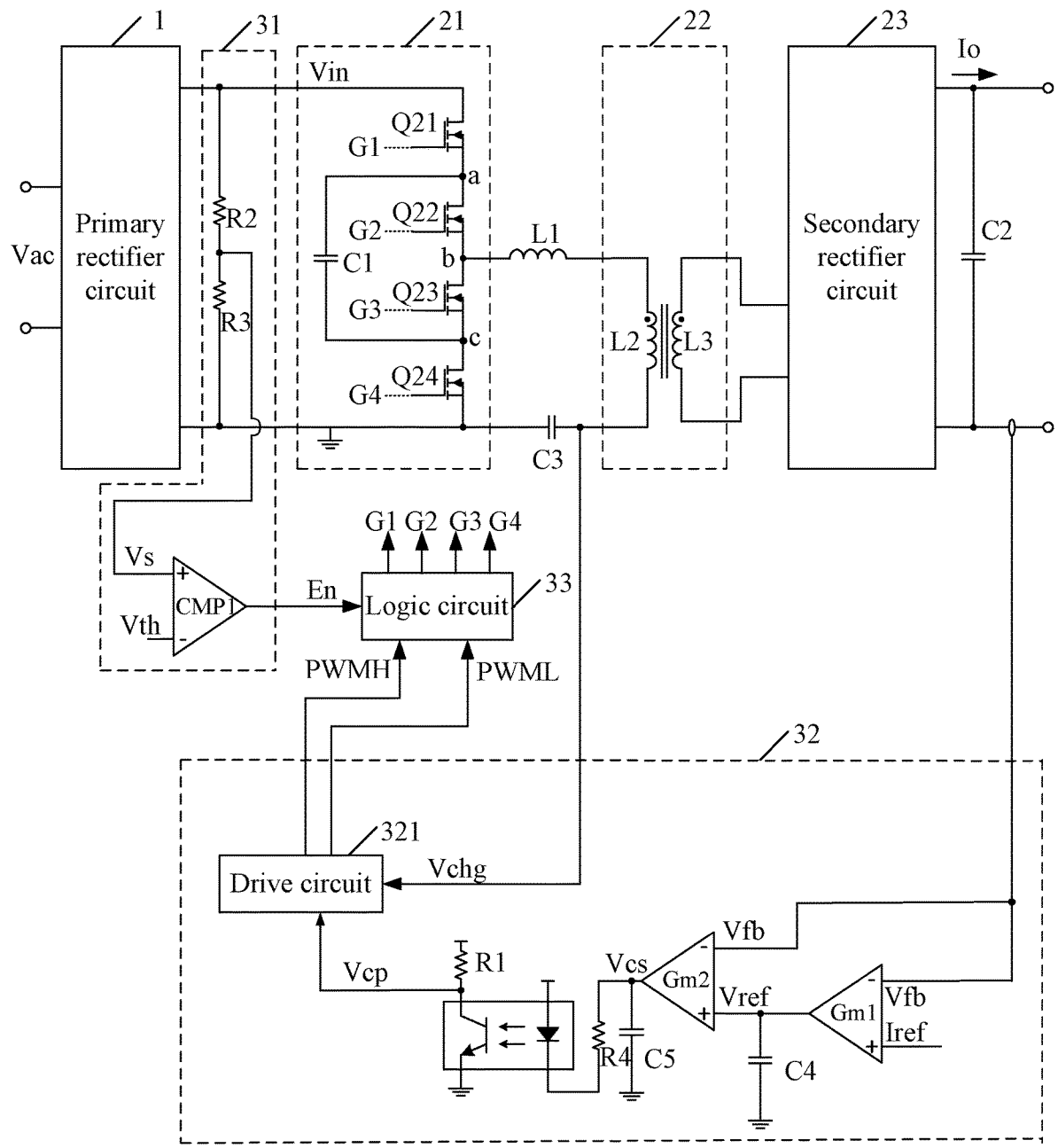
FIG. 8 is a schematic block diagram of a third example battery charging circuit, in accordance with embodiments of the present invention.

Referring now to FIG. 8, shown is a schematic block diagram of a third example battery charging circuit, in accordance with embodiments of the present invention. In this particular example, DC-DC converter 2 utilizes a three-level LLC circuit with flying capacitors, which can include switching circuit 21, transformer 22, secondary rectifier circuit 23, resonant inductor L1, and resonant capacitor C3. Switching circuit 21 can include switches Q21, Q22, Q23, and Q24, where the common node of switches Q21 and Q22 is terminal/node "a," the common node of switch Q22 and switch Q23 is terminal/node "b," and the common node of switches Q23 and Q24 is terminal/node "c." Switch Q21 can connect between the output port of primary rectifier circuit 1 and common node a, switch Q22 can connect between common node a and common node b, switch Q23 can connect between common node b and common node c, and switch Q24 can connect between common node c and the ground terminal.

Capacitor C1 can connect between common node a and common node c, and capacitor C1 is not an electrolytic capacitor. Switches Q21, Q22, Q23, and Q24 can respectively be controlled by control signals G1, G2, G3, and G4 to be turned on or off. For example, switches Q21 and Q24 can be controlled to be turned on or off in the opposite manner, and switches Q22 and Q23 can be controlled to be turned on or off in the opposite manner to charge the battery. Alternatively, switches Q21 and Q24 can be controlled to be turned on or off synchronously, and switches Q22 and Q23 can be controlled to be turned on or off synchronously in the opposite manner relative switches Q21 and Q24, in order to charge the battery.

In this example, transformer 22 can include primary winding L2 and secondary winding L3. Resonant inductor L1 can connect between common node b and one end of primary winding L2, and resonant capacitor C3 can connect between the other end of primary winding L2 and the ground terminal. Thus, resonant inductor L1, primary winding L2 and resonant capacitor C3 may be coupled in series to form the LLC resonant circuit, where resonant capacitor C3 is not an electrolytic capacitor. Secondary rectifier circuit 23 can connect to secondary winding L3, and the induced AC current of secondary-side may be rectified by secondary rectifier circuit 23 to provide charging current Io output by DC-DC converter 2 to charge the battery. In this example, drive circuit 321 may directly acquire the voltage of resonant capacitor C3 as voltage signal Vchg, and can generate control signals PWMH and PWML according to voltage signal Vchg and compensation signal Vcp. As shown in FIG. 6, drive circuit 321 can sample the resonance current, and the sampled resonance current may be integrated by capacitor Cchg in order to obtain voltage signal Vchg.

Figure 9:
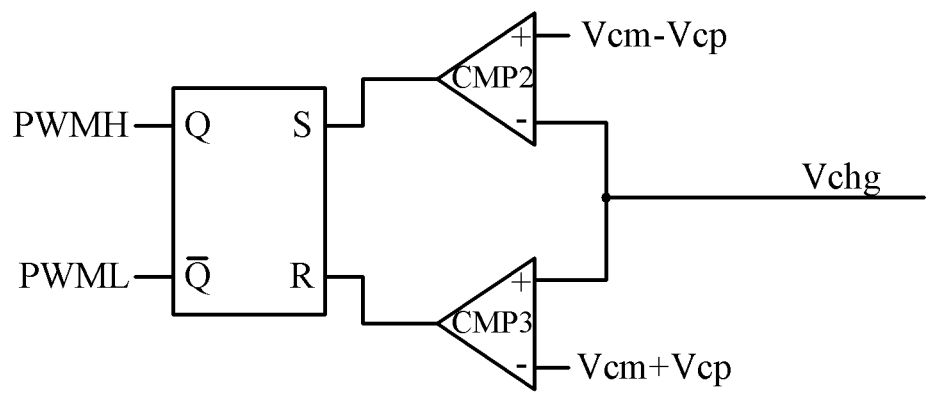
FIG. 9 is a schematic block diagram of an example drive circuit for the third example battery charging circuit, in accordance with embodiments of the present invention.

Referring now to FIG. 9, shown is a schematic block diagram of an example drive circuit for the third example battery charging circuit, in accordance with embodiments of the present invention. In this particular example, drive circuit 321 can include comparator CMP2, comparator CMP3, and RS flip-flop. For example, voltage signal Vchg can be input to the inverting input terminal of comparator CMP2 and the non-inverting input terminal of comparator CMP3. At the same time, drive circuit 321 may acquire a fixed common mode voltage signal Vcm. The non-inverting input terminal of comparator CMP2 may receive the difference between common mode voltage signal Vcm and compensation signal Vcp, and the inverting input terminal of comparator CMP3 may receive the sum of common mode voltage signal Vcm and compensation signal Vcp. Logic circuit 33 can adjust charging current Io according to control signal En and control signals PWMH and PWML. Further, logic circuit 33 may not activate control signals G1, G2, G3, and G4 when control signal En is at a low level. Logic circuit 33 may generate control signals G1, G2, G3, and G4 according to control signals PWMH and PWML when control signal En is at a high level, in order to control the operation frequency of switching circuit 21 with a fixed duty cycle.

Figure 10:
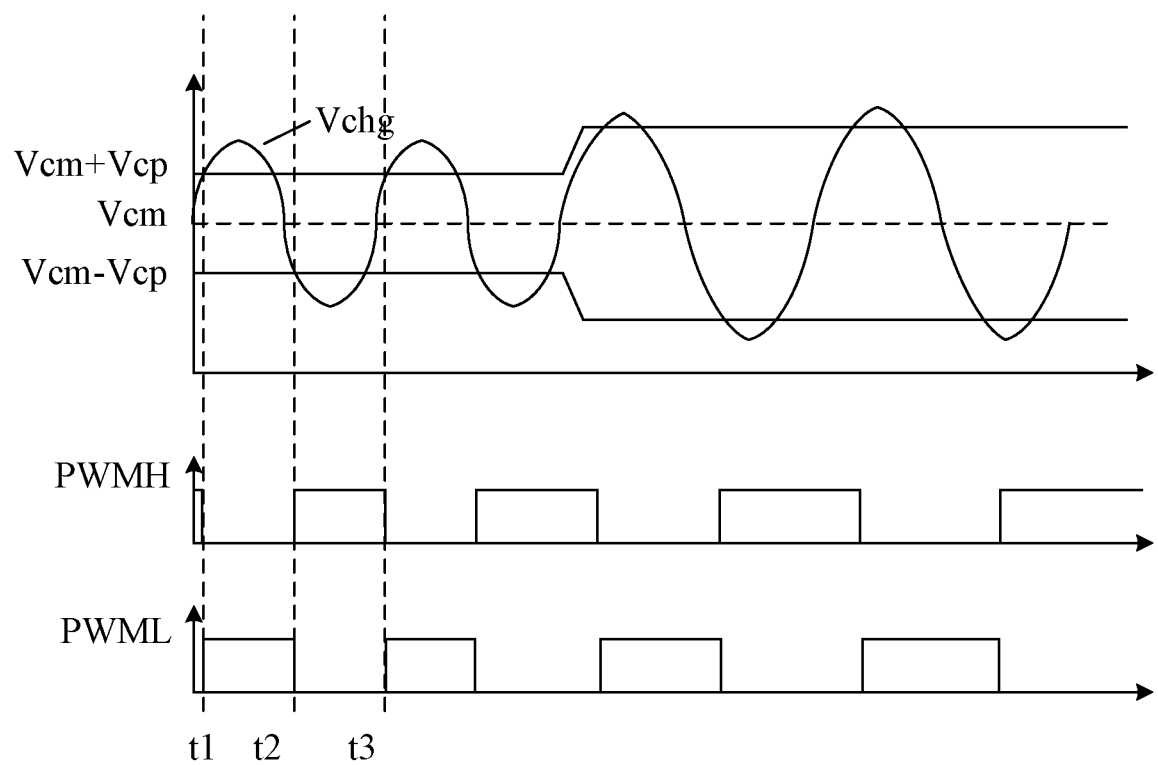
FIG. 10 is a waveform diagram of example operation of the third example battery charging circuit, in accordance with embodiments of the present invention.

Referring now to FIG. 10, shown is a waveform diagram of example operation of the third example battery charging circuit, in accordance with embodiments of the present invention. Here, shown are waveforms of voltage signal Vchg and control signals PWMH and PWML during the period when switches Q21, Q22, Q23, and Q24 are alternately turned on or off, where the abscissa is time t. For example, at time t1, voltage signal Vchg rises to be equal to Vcm+Vcp, and the output signal of comparator CMP3 is at the high level. That is, the reset signal of the RS flip-flop is active, control signal PWMH is switched to be the low level, and control signal PWML is switched to be the high level. At time t2, voltage signal Vchg can drop to be equal to Vcm-Vcp, and the output signal of comparator CMP2 may be at the high level. That is, the set signal of the RS flip-flop can be active, control signal PWMH may be switched to be the high level, and control signal PWML may be switched to be the low level. The duty cycles of control signals PWMH and PWML can be fixed (e.g., about 50%), and the operation frequency of DC-DC converter 2 may be controlled with the fixed duty cycle. In this example, switches Q21, Q22, Q23, and Q24 can use various existing electrically controllable switch, such as a MOSFET, a BJT, or IGBT.

In particular embodiments, the battery charging circuit can adjust the charging current by controlling the operation state of the DC-DC converter according to the charging requirement to make the average value of the charging current meet the charging requirement. In addition, the charging current can be intermittent, and the charging current may be equal to zero at least when the absolute value of the input AC voltage is lower than the predetermined threshold. Thus, the battery can be charged by the charging current which is intermittent, the electrolytic capacitors in the charging circuit can be removed, the volume of the battery charging circuit can be reduced, and the service life and safety performance of the battery charging circuit can be improved.

Figure 11:
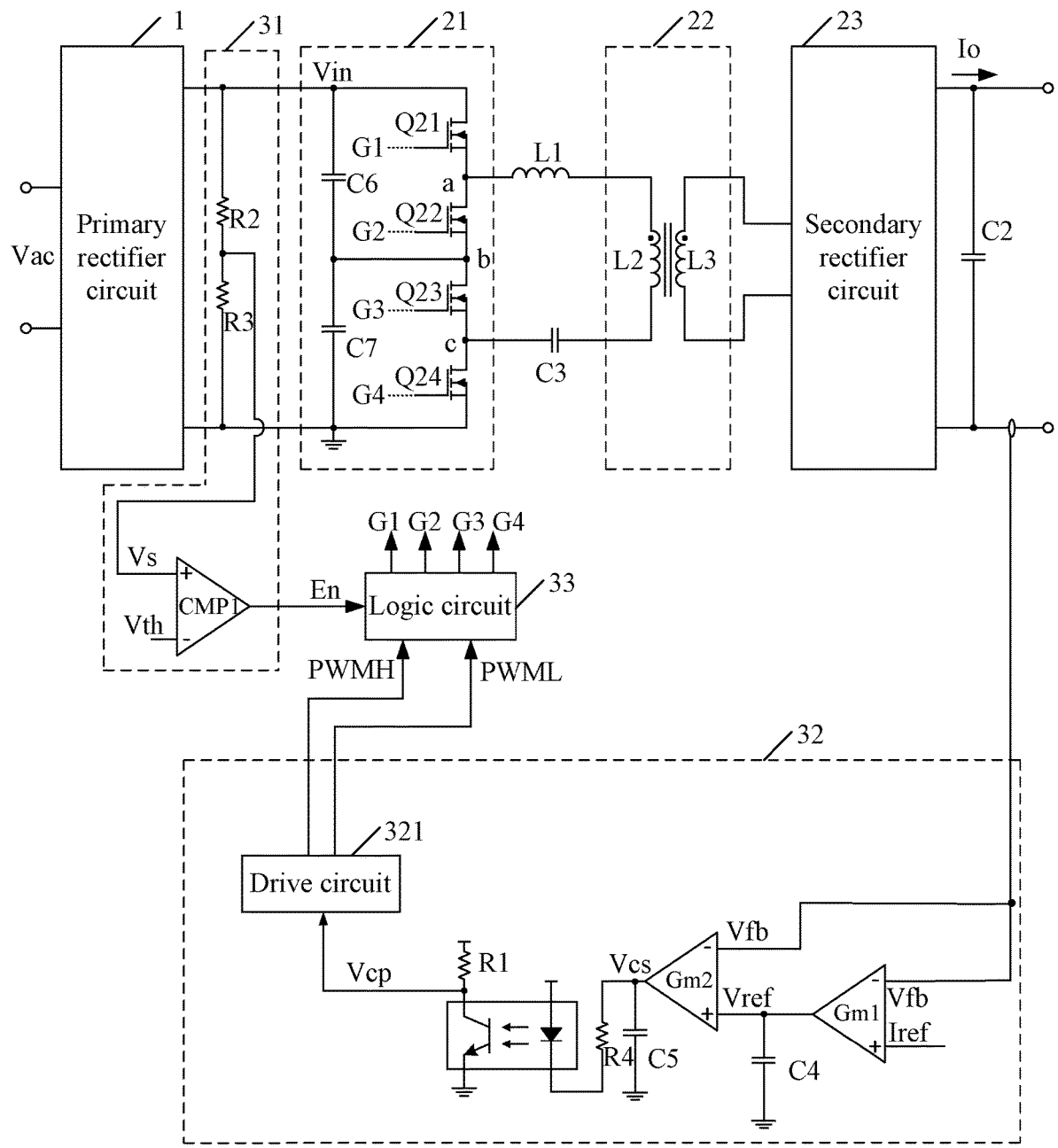
FIG. 11 is a schematic block diagram of a fourth example battery charging circuit, in accordance with embodiments of the present invention.

Referring now to FIG. 11, shown is a schematic block diagram of a fourth example battery charging circuit, in accordance with embodiments of the present invention. In this particular example, DC-DC converter 2 utilizes a three-level LLC circuit, which can include switching circuit 21, transformer 22, secondary rectifier circuit 23, resonant inductor L1, and resonant capacitor C3. Switching circuit 21 can include switches Q21, Q22, Q23, and Q24, where the common node of switches Q21 and Q22 is terminal/node "a," the common node of switch Q22 and switch Q23 is terminal/node "b," and the common node of switches Q23 and Q24 is terminal/node "c." Switch Q21 can connect between the output port of primary rectifier circuit 1 and common node a, switch Q22 can connect between common node a and common node b, switch Q23 can connect between common node b and common node c, and switch Q24 can connect between common node c and the ground terminal. Capacitor C6 can connect between the output port of primary rectifier circuit 1 and common node b, capacitor C7 can connect between common node b and the ground terminal, and capacitor C6 and capacitor C7 are not electrolytic capacitors. Switches Q21, Q22, Q23, and Q24 can respectively be controlled by control signals G1, G2, G3, and G4 to be turned on or off. For example, switches Q21 and Q24 can be controlled to be turned on or off synchronously, and switches Q22 and Q23 can be controlled to be turned on or off synchronously in the opposite manner with switches Q21 and Q24 to charge the battery. Alternatively switches Q21 and Q22 can be controlled to be turned on or off in the opposite manner, and switches Q23 and Q24 can be controlled to be turned on or off in the opposite manner to charge the battery.

In this example, transformer 22 can include primary winding L2 and secondary winding L3. Resonant inductor L1 can connect between common node a and one end of primary winding L2, and resonant capacitor C3 can connect between the other end of primary winding L2 and common node c. Thus, resonant inductor L1, primary winding L2, and resonant capacitor C3 may be coupled in series to form the LLC resonant circuit, where resonant capacitor C3 is not an electrolytic capacitor. Secondary rectifier circuit 23 can connect to secondary winding L3, and the induced AC current of secondary-side may be rectified by secondary rectifier circuit 23 to provide charging current Io output by DC-DC converter 2 to charge the battery.

Control circuit 3 can adjust the operation frequency of DC-DC converter 2 to adjust charging current Io. Logic circuit 33 may not activate control signals G1, G2, G3, and G4 when control signal En is at a low level, and logic circuit 33 may generate control signals G1, G2, G3, and G4 according to control signals PWMH and PWML when control signal En is at a high level to control the operation frequency of switching circuit 21 with the fixed duty cycle. Further, logic circuit 33 can output different control signals according to the different input AC voltage Vac, such that the battery charging circuit operates in different modes. For example, when input AC voltage Vac is in the low voltage range (e.g., Vac is in the voltage rage of from about 90V to about 132V), DC-DC converter 2 can be controlled to operate in a first mode. When input AC voltage Vac is in the high voltage range (e.g., Vac is in the voltage rage of from about 176V to about 264V), DC-DC converter 2 can be controlled to operate in a second mode. When input AC voltage Vac is in the low voltage range, rectified voltage signal Vin is recorded as input voltage Vin1, and when input AC voltage Vac is in the high voltage range, rectified voltage signal Vin is recorded as input voltage Vin2.

Figure 12:
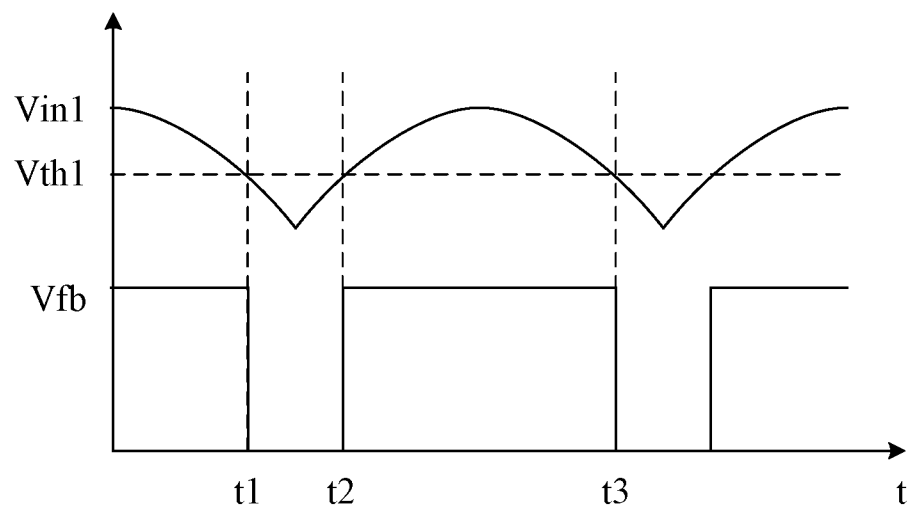
FIG. 12 is a waveform diagram of a first example operation of the fourth example battery charging circuit, in accordance with embodiments of the present invention.

Referring now to FIG. 12, shown is a waveform diagram of a first example operation of the fourth example battery charging circuit, in accordance with embodiments of the present invention. In this particular example, DC-DC converter 2 can be controlled to operate in the first mode, at time t1, input voltage Vin1 drops to be equal to predetermined threshold Vth1, comparator CMP1 outputs a low level. Logic circuit 33 may not activate control signals, and can disable switching circuit 21; that is, switches Q21, Q22, Q23, and Q24 can be turned off. Accordingly, charging current Io is equal to zero and output current sampling signal Vfb is equal to zero. At time t2, input voltage Vin1 can rise to be equal to predetermined threshold Vth1, and comparator CMP1 may output a high level. Logic circuit 33 can generate control signals to control switches Q21, Q22, Q23, and Q24 to be turned on or off alternately and to enable switching circuit 21. Therefore, charging current Io is higher (e.g., greater than zero) and output current sampling signal Vfb is higher. Switches Q21, Q22, Q23, and Q24 may both be turned off during a period in each cycle, such that charging current Io is equal to zero, and switches Q21, Q22, Q23, and Q24 can alternately be turned on or off during another period in each cycle, such that charging current Io is higher (e.g., greater than zero). In this way, charging current Io can be a pulse current.

Figure 13:
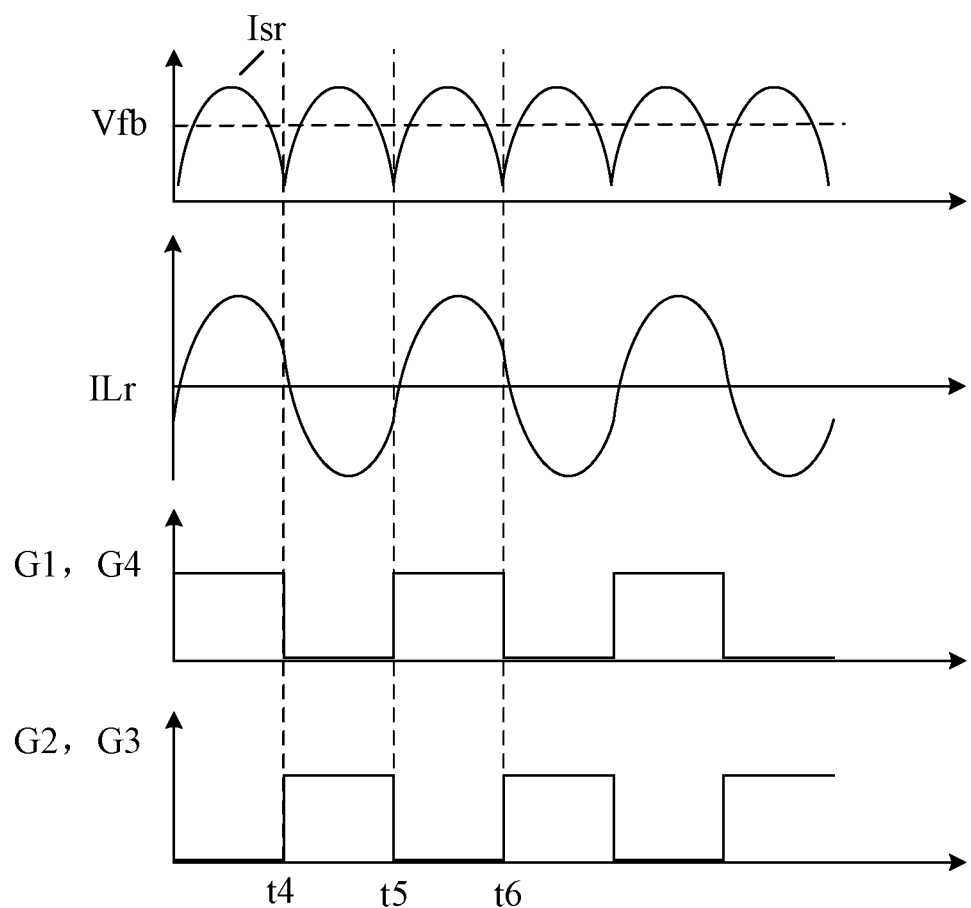
FIG. 13 is a waveform diagram of first example control signaling of the fourth example battery charging circuit, in accordance with embodiments of the present invention.

Referring now to FIG. 13, shown is a waveform diagram of first example control signaling of the fourth example battery charging circuit, in accordance with embodiments of the present invention. In this particular example, DC-DC converter 2 can be controlled to operate in the first mode. Here, shown are waveforms of operation during the period when switches Q21, Q22, Q23, and Q24 are alternately turned on or off, where the abscissa is time t, Isr is the output current of secondary rectifier circuit 23, and ILr is the inductor current. For example, during the period t4-t5, control signals G1 and G4 are at the low level, and control signals G2 and G3 are at the high level to make switches Q21 and Q24 off and switches Q22 and Q23 on. At this time, inductor current ILr is negative. During the period t5-t6, control signals G1 and G4 are at the high level, and control signals G2 and G3 are at the low level to make switches Q21 and Q24 on and switches Q22 and Q23 off. At this time, inductor current ILr is positive.

Figure 14:
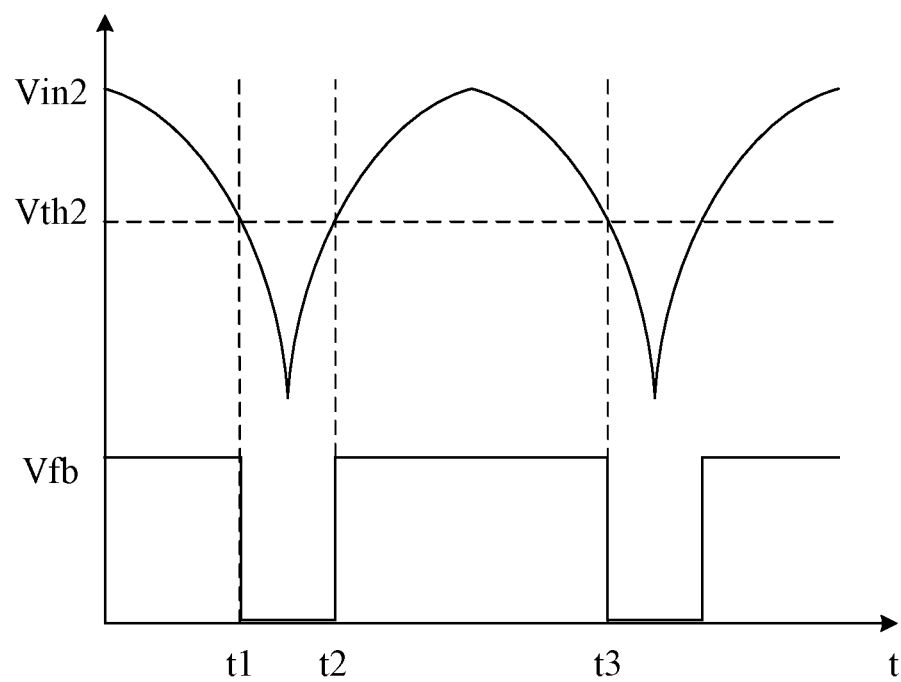
FIG. 14 is a waveform diagram of a second example operation of the fourth example battery charging circuit, in accordance with embodiments of the present invention.

Referring now to FIG. 14, shown is a waveform diagram of a second example operation of the fourth example battery charging circuit, in accordance with embodiments of the present invention. In this particular example, DC-DC converter 2 can be controlled to operate in the second mode. At time t1, input voltage Vin2 drops to be equal to predetermined threshold Vth2, and comparator CMP1 outputs a low level. Logic circuit 33 may not activate control signals, and controls switching circuit 21 can be disabled; that is, switches Q21, Q22, Q23, and Q24 are turned off. Thus, charging current Io is equal to zero and output current sampling signal Vfb is equal to zero. At time t2, input voltage Vin2 rises to be equal to second predetermined threshold Vth2, and comparator CMP1 can output a high level. Logic circuit 33 can output control signals to control switches Q21, Q22, Q23, and Q24 to be turned on or off alternately and control switching circuit 21 to operate. Therefore, charging current Io may be higher (e.g., greater than zero) and output current sampling signal Vfb is higher. Switches Q21, Q22, Q23, and Q24 may both be turned off during a period in each cycle, such that charging current Io is equal to zero, and switches Q21, Q22, Q23, and Q24 are alternately turned on or off during another period in each cycle, and charging current Io is higher (e.g., greater than zero). In this way, charging current Io can be a pulse current, where Vth2=2*Vth1, and Vin2=2*Vin1.

Figure 15:
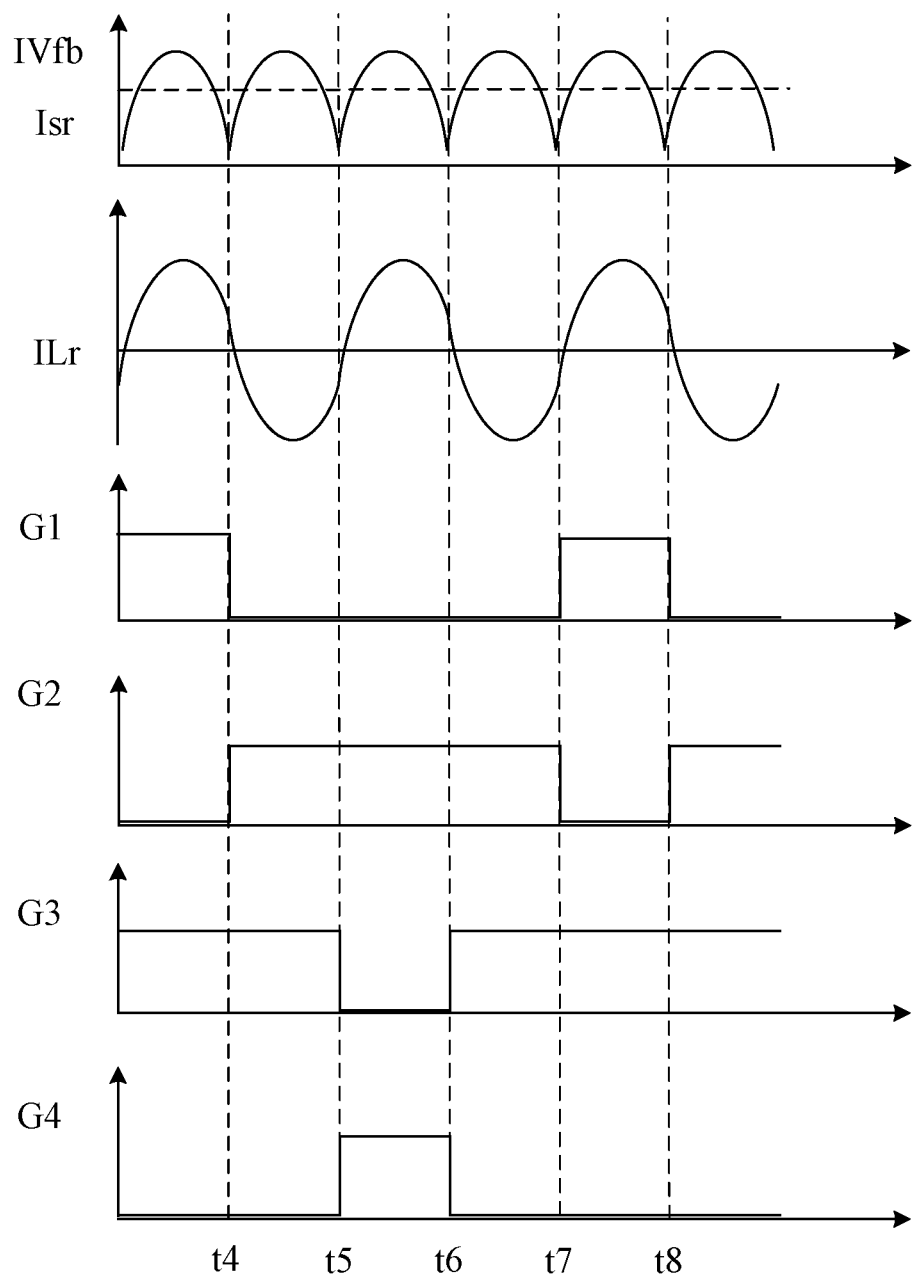
FIG. 15 is a waveform diagram of second example control signaling of the fourth example battery charging circuit, in accordance with embodiments of the present invention.

Referring now to FIG. 15, shown is a waveform diagram of second example control signaling of the fourth example battery charging circuit, in accordance with embodiments of the present invention. In this particular example, DC-DC converter 2 can be controlled to operate in the first mode. Here, shown are waveforms of operation during the period when switches Q21, Q22, Q23, and Q24 are alternately turned on or off, where the abscissa is time t, Isr is the output current of secondary rectifier circuit 23, and ILr is the inductor current. For example, during the period t4-t5, control signals G1 and G4 can be at the low level, and control signals G2 and G3 may be at the high level, in order to make switches Q21 and Q24 off and switches Q22 and Q23 on. At this time, inductor current ILr is negative. During the period t5-t6, control signals G2 and G4 can be at the high level, and control signals G1 and G3 may be at the low level, in order to make switches Q22 and Q24 on and switches Q21 and Q23 off. At this time, inductor current ILr is positive. During the period t6-t7, control signals G1 and G4 may be at the low level, and control signals G2 and G3 can be at the high level, in order to make switches Q21 and Q24 off and switches Q22 and Q23 on. At this time, inductor current ILr is negative. During the period t7-t8, control signals G2 and G4 can be at the low level, and control signals G1 and G3 may be at the high level to make switches Q22 and Q24 off and switches Q21 and Q23 on. At this time, inductor current ILr is positive.

Therefore, when input AC voltage Vac is in the low voltage range, switches Q21 and Q24 can be controlled to be turned on or off synchronously, and switches Q22 and Q23 can be controlled to be turned on or off synchronously in the opposite manner as compared to switches Q21 and Q24. When input AC voltage Vac is in the high voltage range, switches Q21 and Q22 can be controlled to be turned on or off in the opposite manner, and switches Q23 and Q24 can be controlled to be turned on or off in the opposite manner. Thus, the increase in gain caused by the increase in input AC voltage may be compensated by controlling the operation frequency, the gain may be relatively stable, and optimization of the battery charging current can be achieved. In this example, switches Q21, Q22, Q23, and Q24 can use various existing electrically controllable switch, such as a MOSFET, a BJT, or IGBT.

In particular embodiments, the battery charging circuit can adjust the charging current by controlling the operation state of the DC-DC converter according to the charging requirement, in order to make the average value of the charging current meet the charging requirement. The charging current can be intermittent, and the charging current may be equal to zero at least when the absolute value of the input AC voltage is lower than the predetermined threshold. Thus, the battery can be charged by the charging current which is intermittent, the electrolytic capacitors in the charging circuit can be removed, the volume of the battery charging circuit can be reduced, and the service life and safety performance of the battery charging circuit can be improved.

Figure 16:
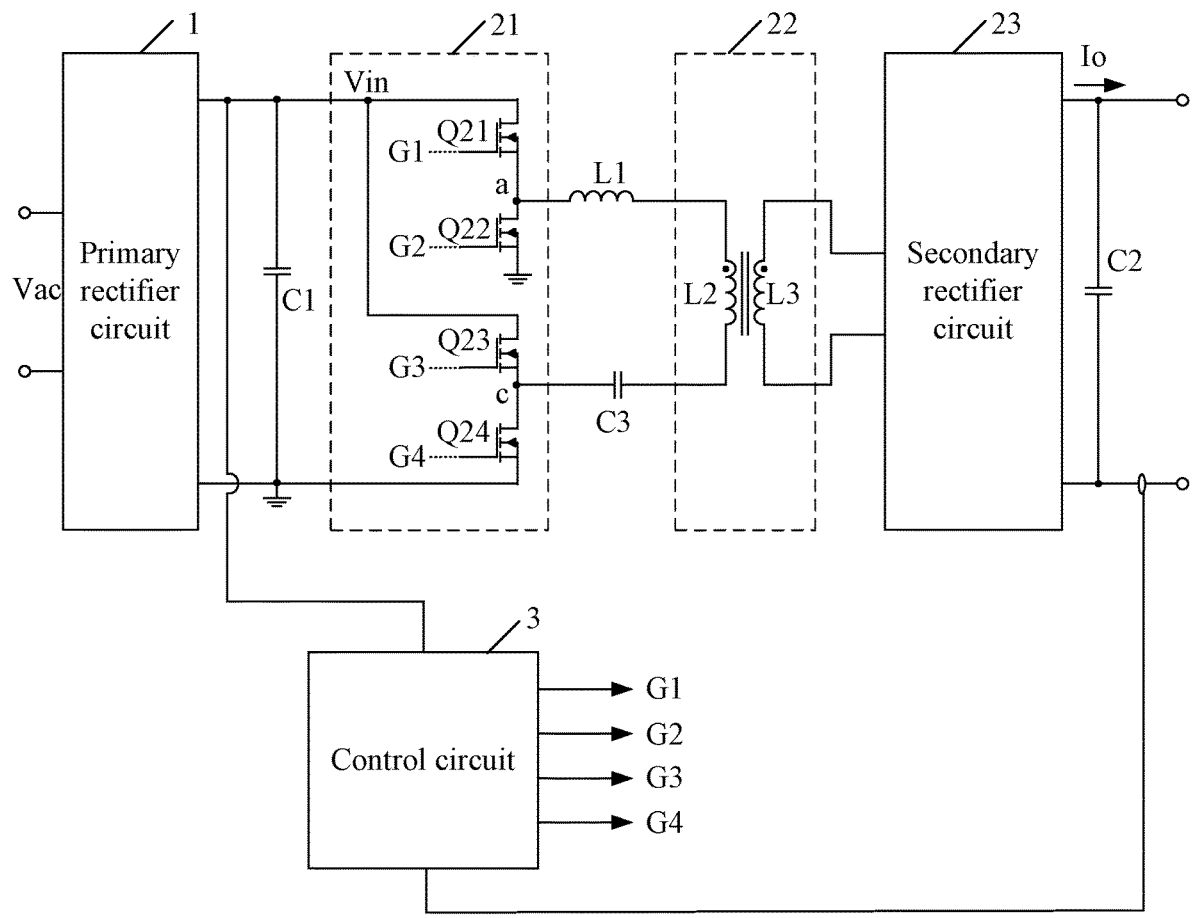
FIG. 16 is a schematic block diagram of a fifth example battery charging circuit, in accordance with embodiments of the present invention.

Referring now to FIG. 16, shown is a schematic block diagram of a fifth example battery charging circuit, in accordance with embodiments of the present invention. In this particular example, DC-DC converter 2 uses a full-bridge LLC circuit, which can include switching circuit 21, transformer 22, secondary rectifier circuit 23, resonant inductor L1, and resonant capacitor C3. Switching circuit 21 can include switches Q21, Q22, Q23, and Q24, where the common node of switches Q21 and Q22 is terminal/node "a," and the common node of switches Q23 and Q24 is terminal/node "c." Switch Q21 can connect between the output port of primary rectifier circuit 1 and common node a, switch Q22 can connect between common node a and the ground terminal, switch Q23 can connect between the output port of primary rectifier circuit 1 and common node c, and switch Q24 can connect between common node c and the ground terminal. Capacitor C1 can connect between the output port of primary rectifier circuit 1 and the ground terminal, and capacitor C1 is not an electrolytic capacitor. Switches Q21, Q22, Q23, and Q24 can respectively be controlled by control signals G1, G2, G3, and G4 to be turned on or off. For example, switches Q21 and Q24 can be controlled to be turned on or off synchronously, and switches Q22 and Q23 can be controlled to be turned on or off synchronously in the opposite manner as switches Q21 and Q24 to charge the battery.

In this example, transformer 22 can include primary winding L2 and secondary winding L3. Resonant inductor L1 can connect between common node a and one end of primary winding L2, and resonant capacitor C3 can connect between the other end of primary winding L2 and common node c. Thus, resonant inductor L1, primary winding L2, and resonant capacitor C3 can be coupled in series to form the LLC resonant circuit, where resonant capacitor C3 is not an electrolytic capacitor. Secondary rectifier circuit 23 can connect to secondary winding L3, and the induced AC current of secondary-side may be rectified by secondary rectifier circuit 23 to provide charging current Io output by DC-DC converter 2, in order to charge the battery.

Control circuit 3 can adjust the operation frequency of DC-DC converter 2 to adjust charging current Io. In this example, the battery charging circuit can adjust the charging current by controlling the operation state of the DC-DC converter according to the charging requirement in order to make the average value of the charging current meet the charging requirement. The charging current can be intermittent, and the charging current may be equal to zero at least when the absolute value of the input AC voltage is lower than the predetermined threshold. Thus, the battery can be charged by the charging current which is intermittent, the electrolytic capacitors in the charging circuit can be removed, the volume of the battery charging circuit can be reduced, and the service life and safety performance of the battery charging circuit can be improved.

It should be understood that the DC-DC converters and the control circuits of certain embodiments are not limited to the above exemplary combinations. The control circuits and DC-DC converters as described above can be combined in any suitable manner to form the battery charging circuit of certain embodiments. It should also be understood that the particular embodiments are described using the waveform of the pulse current as a square wave as an example, but the waveform of the pulse current is not limited to a square wave, and can be other shapes (e.g., a triangular wave, a sine wave, etc.). It should also be understand that the capacitive elements utilized herein are not relatively large electrolytic capacitors, but instead are used for filtering, integration, etc., and can be chip capacitors or other smaller capacitors.

Figure 17:
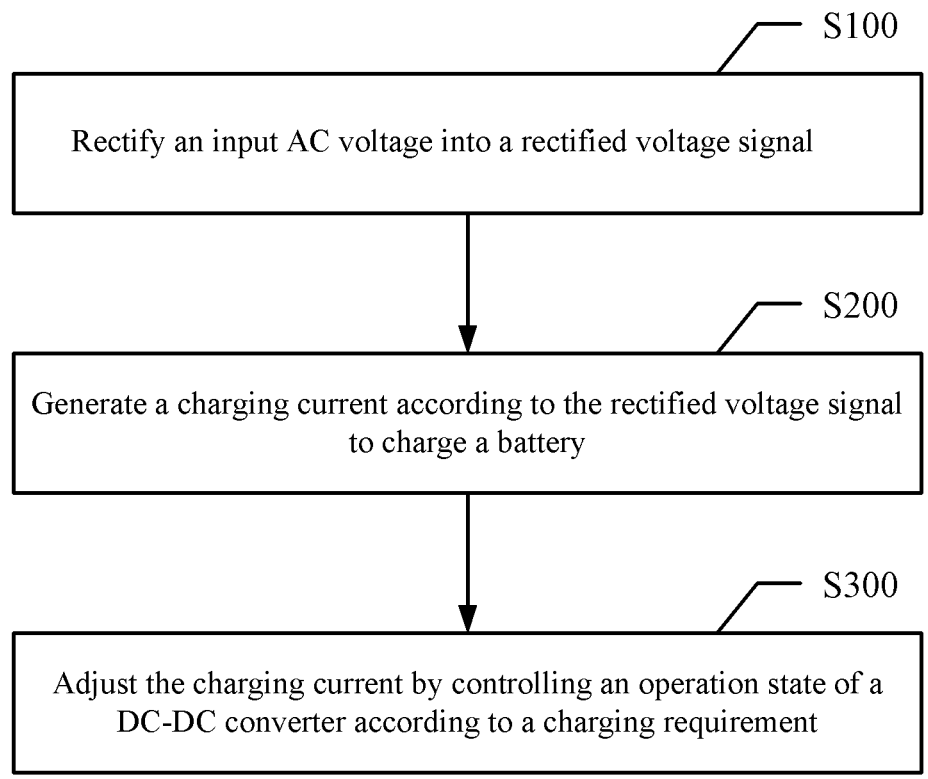
FIG. 17 is a flow diagram of an example battery charging method, in accordance with embodiments of the present invention.

Referring now to FIG. 17, shown is a flow diagram of an example battery charging method, in accordance with embodiments of the present invention. In this particular example, a battery charging method can include, at S100, rectifying an input AC voltage to obtain a rectified voltage signal. At S200, a charging current can be generated according to the rectified voltage signal, in order to charge the battery. At S300, the charging current can be adjusted by controlling an operation state of DC-DC converter according to a charging requirement. The charging current can be adjusted by controlling the operation state of the DC-DC converter according to the charging requirement, in order to make the average value of the charging current meet the charging requirement. The charging current may be intermittent, and the charging current can be equal to zero at least when the absolute value of the input AC voltage is lower than the predetermined threshold.

A waveform of the charging current can be controlled to be a pulse waveform at most when the absolute value of the input AC voltage is greater than the predetermined threshold. For example, the frequency of the charging current can be about twice as greater as the frequency of the input AC voltage. Further, the value of the charging current may be fixed in the interval where the charging current is not equal to zero, and the waveform of the charging current can be a square wave. Alternatively, the value of the charging current may be variable in the interval where the charging current is not equal to zero, and the waveform of the charging current can be a triangular wave, a sine wave, etc.

Further, the DC-DC converter can be a resonant converter or a multi-level converter, and the charging current may be adjusted by adjusting the operation frequency of the DC-DC converter. For example, the operation frequency of the DC-DC converter can be adjusted with a fixed duty cycle. For example, neither the input port nor the output port of the DC-DC converter is provided with electrolytic capacitors. In particular embodiments, the charging current can be adjusted by controlling the operation state of the DC-DC converter according to the charging requirement to make the average value of the charging current meet the charging requirement, where the charging current is intermittent, and the charging current is equal to zero at least when the absolute value of the input AC voltage is lower than the predetermined threshold. Thus, the battery can be charged by the charging current which is intermittent, the electrolytic capacitors in the charging circuit can be removed, the volume of the battery charging circuit can be reduced, and the service life and safety performance of the battery charging circuit can be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A battery charging circuit, comprising:
   a) a primary rectifier circuit configured to rectify an input AC voltage into a rectified voltage signal;
   b) a DC-DC converter configured to generate a charging current according to the rectified voltage signal, in order to charge a battery;
   c) a control circuit configured to adjust the charging current by controlling an operation state of the DC-DC converter according to a charging requirement, in order to make an average value of the charging current meet the charging requirement;
   d) wherein the charging current is controlled to be zero when an absolute value of the input AC voltage is lower than a predetermined threshold; and
   e) wherein the control circuit comprises a first control signal generation circuit configured to generate a first control signal according to the rectified voltage signal and the predetermined threshold, a second control signal generation circuit configured to generate a second control signal according to the charging requirement and the charging current, a logic circuit configured to adjust the charging current according to the first and second control signals, wherein the logic circuit is configured to control the DC-DC converter to operate with a fixed duty cycle according to the second control signal in response to the first control signal being active, and to disable the DC-DC converter in response to the first control signal being inactive.

2. The battery charging circuit of claim 1, wherein the charging current is controlled to be not zero when the absolute value of the input AC voltage is greater than the predetermined threshold.

3. The battery charging circuit of claim 1, wherein a frequency of the charging current is configured to be twice as great as a frequency of the input AC voltage.

4. The battery charging circuit of claim 1, wherein a value of the charging current is fixed in an interval where the charging current is not equal to zero.

5. The battery charging circuit of claim 1, wherein a value of the charging current is variable in an interval where the charging current is not equal to zero.

6. The battery charging circuit of claim 1, wherein the DC-DC converter is configured as a resonant converter or a multi-level converter, and the control circuit is configured to adjust the charging current by adjusting an operation frequency of the DC-DC converter.

7. The battery charging circuit of claim 1, wherein the control circuit is configured to adjust the charging current by adjusting an operation frequency of the DC-DC converter with a fixed duty cycle.

8. The battery charging circuit of claim 1, wherein an input port and an output port of the DC-DC converter are not provided with electrolytic capacitors.

9. The battery charging circuit of claim 1, wherein the first control signal generation circuit comprises a first comparator configured to generate the first control signal by comparing a sampling signal of the rectified voltage signal against the predetermined threshold.

10. The battery charging circuit of claim 1, wherein the first control signal generation circuit comprises:
    a) a first error amplifier configured to generate a first error signal according to a sampling signal of the charging current and a current reference signal, wherein the current reference signal represents the charging requirement;
    b) a second error amplifier configured to generate a second error signal according to the sampling signal of the charging current and the first error signal;
    c) a compensation circuit configured to generate a compensation signal according to the second error signal; and
    d) a drive circuit configured to generate the second control signal according to the compensation signal.

11. The battery charging circuit of claim 10, wherein the drive circuit is configured to generate the second control signal according to the compensation signal and a sampling signal of a resonance current.

12. The battery charging circuit of claim 11, wherein the drive circuit comprises:
    a) a second comparator configured to generate a set signal according to the sampling signal of the resonance current and the compensation signal;
    b) a third comparator configured to generate a reset signal according to the sampling signal of the resonance current and the compensation signal; and
    c) a flip-flop configured to generate the second control signal according to the set signal and the reset signal.

13. The battery charging circuit of claim 10, wherein the drive circuit is configured to generate the second control signal according to the compensation signal and a sampling signal of a resonance voltage.

14. The battery charging circuit of claim 13, wherein the drive circuit comprises:
    a) a second comparator configured to generate a set signal according to the sampling signal of the resonance voltage and the compensation signal;
    b) a third comparator configured to generate a reset signal according to the sampling signal of the resonance voltage and the compensation signal; and
    c) a flip-flop configured to generate the second control signal according to the set signal and the reset signal.

15. The battery charging circuit of claim 1, wherein the DC-DC converter comprises:
    a) a switching circuit comprising a half-bridge circuit;
    b) a transformer comprising a primary winding and a secondary winding; and
    c) a resonant inductor and a resonant capacitor coupled in series with the primary winding to form a resonance circuit.

16. The battery charging circuit of claim 15, wherein the switching circuit comprises:
    a) a first switch coupled between an output port of the primary rectifier circuit and a first common node;
    b) a second switch coupled between the first common node and a ground terminal; and
    c) wherein the resonance circuit is coupled between the first common node and the ground terminal.

17. The battery charging circuit of claim 15, wherein the switching circuit comprises:

a) a first switch coupled between an output port of the primary rectifier circuit and a first common node;
b) a second switch coupled between the first common node and a ground terminal;
c) a third switch coupled between the output port of the primary rectifier circuit and a second common node;
d) a fourth switch coupled between the second common node and the ground terminal; and
e) wherein the resonance circuit is coupled between the first common node and the second common node.

18. The battery charging circuit of claim 15, wherein the switching circuit comprises:
a) a first switch coupled between an output port of the primary rectifier circuit and a first common node;
b) a second switch coupled between the first common node and a second common node;
c) a third switch coupled between the second common node and a third common node;
d) a fourth switch coupled between the third common node and a ground terminal; and
e) wherein the resonance circuit is coupled between the first common node and the third common node.

19. The battery charging circuit of claim 15, wherein the switching circuit comprises:
a) a first switch coupled between an output port of the primary rectifier circuit and a first common node;
b) a second switch coupled between the first common node and a second common node;
c) a third switch coupled between the second common node and a third common node;
d) a fourth switch coupled between the third common node and a ground terminal; and
e) wherein the resonance circuit is coupled between the second common node and the ground terminal.

* * * * *